United States Patent
Dureau

(10) Patent No.: US 7,634,795 B2
(45) Date of Patent: Dec. 15, 2009

(54) NEXT GENERATION TELEVISION RECEIVER

(75) Inventor: Vincent Dureau, Palo Alto, CA (US)

(73) Assignee: OpenTV, Inc., San Francisco, CA (US)

(*) Notice: Subject to any disclaimer, the term of this patent is extended or adjusted under 35 U.S.C. 154(b) by 965 days.

(21) Appl. No.: 10/044,348

(22) Filed: Jan. 11, 2002

(65) Prior Publication Data
US 2003/0135860 A1 Jul. 17, 2003

(51) Int. Cl.
*H04N 7/18* (2006.01)
*H04N 7/173* (2006.01)

(52) U.S. Cl. .............. 725/80; 725/74; 725/78; 725/85; 725/105

(58) Field of Classification Search .......... 725/80, 725/82, 132, 140, 152
See application file for complete search history.

(56) References Cited

U.S. PATENT DOCUMENTS

| | | | |
|---|---|---|---|
| 5,577,042 A * | 11/1996 | McGraw et al. ........... | 370/257 |
| 5,918,013 A | 6/1999 | Mighdoll et al. | |
| 5,996,022 A | 11/1999 | Krueger et al. | |
| 6,040,829 A * | 3/2000 | Croy et al. ............... | 715/864 |
| 6,049,821 A | 4/2000 | Theriault et al. | |
| 6,185,625 B1 | 2/2001 | Tso et al. | |
| 6,237,031 B1 | 5/2001 | Knauerhase et al. | |
| 6,237,049 B1 | 5/2001 | Ludtke et al. | |
| 6,421,069 B1 * | 7/2002 | Ludtke et al. ............. | 715/762 |
| 6,449,767 B1 * | 9/2002 | Krapf et al. .............. | 725/110 |
| 6,532,593 B1 * | 3/2003 | Moroney ................. | 725/142 |

(Continued)

FOREIGN PATENT DOCUMENTS

EP 0 964 558 9/1998

(Continued)

OTHER PUBLICATIONS

Kunzman and Weizel, 1394 High Performance Serial Bus: The Digital Interface for ATV, Texas Instruments.*

(Continued)

*Primary Examiner*—Christopher Kelley
*Assistant Examiner*—Justin E Shepard
(74) *Attorney, Agent, or Firm*—Rory D. Rankin; Meyertons Hood Kivlin Kowert & Goetzel, P.C.

(57) ABSTRACT

A method and mechanism for configuring a receiver as a proxy to transcode data and provide for intercommunication among secondary devices. In one embodiment, a proxy receiver in a viewer's home is configured to perform transcoding and other processing to enable use of services by secondary devices which would otherwise not be able to utilize such services. In addition, the proxy receiver may be configured to provide communication between devices which would otherwise not be able to communicate with one another. In one embodiment, the proxy receiver includes a receiver configured to receive programming signals, an I/O interface configured to communicate with a secondary device, and a transcode subsystem. The transcode subsystem is configured to detect received data, determine a target secondary device of the received data, determine a target data format corresponding to the target secondary device, and initiate transcoding of the received data to the target data format. Additionally, the transcode subsystem may be configured to detect an attempted communication from an unregistered secondary device, and either register the device if the data format of the secondary device is supported, or initiate a request for a transcode subunit which supports the data format of the unregistered secondary device if the data format is not supported.

31 Claims, 6 Drawing Sheets

U.S. PATENT DOCUMENTS

| | | | |
|---|---|---|---|
| 6,744,967 B2 * | 6/2004 | Kaminski et al. | 386/46 |
| 2001/0018718 A1 | 8/2001 | Ludtke et al. | |
| 2002/0019984 A1 * | 2/2002 | Rakib | 725/111 |
| 2002/0104019 A1 * | 8/2002 | Chatani et al. | 713/201 |
| 2003/0066084 A1 * | 4/2003 | Kaars | 725/89 |
| 2003/0110513 A1 * | 6/2003 | Plourde et al. | 725/134 |

FOREIGN PATENT DOCUMENTS

WO     WO 01/47248     6/2001

OTHER PUBLICATIONS

International Search Report; PCT/US 02/38869; Mailed Aug. 05, 2003.

WAG UAProf; Version 20; Oct. 2001; Wireless Application Protocol Forum, Ltd. (WAP-248-UAPROF-20011020-a).

* cited by examiner

NEXT GENERATION TELEVISION RECEIVER

BACKGROUND OF THE INVENTION

1. Field of the Invention

The present invention relates generally to television systems and, more particularly, to the use of a proxy server in a local area network.

2. Description of Related Art

Television service providers, such as a satellite or terrestrial broadcaster, or a cable multiple system operator (MSO), transmit audio-video streams to a viewer's television system. The viewer's television system frequently consists of a set-top box connected to a television set and a recording device, but may consist of any number of suitable devices. In addition to the audio and video that viewers typically think of as television programs, television service providers may transmit additional information as well. For example, the additional information may be instructions which are interpreted by an interpreter or virtual machine. Alternatively, a service provider may transmit HTML, MHEG, Flash or other presentation data for rendering by a presentation engine. If the broadcast is analog, this additional information may be encoded in the VBI (vertical blanking interval). If the broadcast is digital, additional information may be multiplexed with the audio and video according to a standard format, such as MPEG-2, or a proprietary format.

Interactive television systems provide a means to deliver interactive content as well as ordinary television audio and video to a large number of subscribers. Programs broadcast by these systems may incorporate television audio and video, still images, text, interactive graphics and applications, and many other components. The interactive content of the interactive television signal may therefore include application code, data associated with the audio and video, control signals, raw data and many other types of information. Both the interactive content and the audio and video data may be delivered to subscribers as "pushed" data. That is, the data may be broadcast to all the subscribers, regardless of whether or not the subscribers requested the data. The data can also be pulled by the subscriber. That is, data may be requested by and delivered to a specific subscriber. Push and pull methods can be combined to transmit interactive content as well as audio and video.

The interactive functionality of the television is generally controlled by a receiving device, such as an Integrated Receiver Decoder (IRD), which may, for example, be embodied in a television, set-top box, or other device connected to the television. The IRD receives the signal transmitted by a broadcast service provider or system operator, separates the interactive portion from the audio-video portion and decompresses the respective portions of the signal. The IRD uses the interactive information to, for example, execute an application while the audio-video information is decompressed and made ready to be transmitted to the television. The IRD may combine the audio-video information with interactive graphics or audio generated by the interactive application prior to transmitting the information to the television. The interactive graphics and audio may present additional information to the viewer or may prompt the viewer for input. The IRD may provide viewer input or other information to the broadcast service provider or system operator via a return path.

Interactive content such as application code or information relating to television programs is sometimes broadcast in a repeating format. In other words, each piece of information is broadcast a first time, then each is transmitted a second time, and so on. The cycle is repeated so that each piece of interactive data is transmitted, for example, every ten seconds. Further, different cycles can be used for different pieces. For example, more critical data may be repeated more often then less critical data. The pieces of information which are broadcast in this manner may be referred to as a "carousel." It is possible to multiplex two or more carousels in a single data stream. Instead of using a carousel format, some interactive television systems may be configured to broadcast data to be cached in the IRD before it is needed by a particular program. Finally, other systems more heavily use a return path, requiring the IRD to request some of the interactive content via the return path. It should be noted that these methods of broadcasting may be combined in various ways.

Broadcast systems (e.g., interactive television systems) transmit information in a carousel format in order to allow receivers in the system to selectively obtain particular pieces of information in the carousel without requiring a return path from the receivers to the server. If a particular receiver needs a particular piece of information, it can simply wait until the next time that piece of information is broadcast, and then extract the information from the broadcast data stream. Other receivers in the system can operate in the same manner, each receiver waiting for the information it needs, and then using only that information. By employing carousels to broadcast information, the system eliminates the need to connect each of the receivers with the server and further eliminates the need for the server to process individual requests for information. Generally, a broadcast signal may include a number of programs which in turn may include a number of audio/video streams and/or data streams. Data streams may be used to carry data such as interactive application data, subtitle information, or other data.

The pieces of information, or data objects, in a carousel may be intended to be combined in a single object data stream to form a program. This program may also contain streaming data such as audio or video. For example, an interactive television game show may combine television audio and video with interactive content such as application code which allows users to answer questions. Another example would be a news program which combines audio and video with application code that inserts current stock prices in a banner at the bottom of the screen. (It should be noted that many types of programs are possible, and it is not necessary to include either audio, video or interactive content with any particular program. A program might contain only audio and interactive data (e.g., an interactive radio program,) or it might contain only interactive data (e.g., an interactive weather program that does not contain audio or video streams.) Typically, each channel is associated with a corresponding program at a particular point in time. In other cases, such as an interactive weather program that does not contain only interactive data, it is possible that the same program be transmitted all the time on a given channel. When a channel containing a particular program is selected by the interactive television receiver, the data which is being broadcast on that channel is downloaded and the program is started.

In addition to receiving video, audio, and interactive services, some receivers may be configured to enable a viewer to access the Internet, or take advantage of other services. However, because receivers such as set-top boxes typically have relatively small processing capability, services requiring significant processing may require the use of a remotely located proxy to perform the processing. For example, in order to provide Internet access to a television viewer, a broadcaster may include a proxy at the head-end which encodes Web based audio and video into MPEG streams which are then sent to the receiver for rendering. Inputs generated by the viewer are conveyed back to the head-end via a return path. Such systems may require modification of the servers and other equipment at the head-end or service provider location in order to properly function as a proxy. Further, if a particular format is required by a requesting device, each request from the device to the proxy server must include additional information describing the required format which is then used by the proxy server to encode the requested data prior to conveyance to the device. Consequently, additional bandwidth of the MSO's broadband network is consumed. In addition, because of the limited capability of receivers which are typically found in the home, the ability to enhance the functionality of the receiver may be limited.

What is desired is a method and mechanism for enabling enhanced functionality of a receiver in the home in a manner which may reduce network bandwidth consumption.

SUMMARY OF THE INVENTION

Broadly speaking, a method and mechanism for transcoding data and providing communication between devices are contemplated. In one embodiment, a client receiver in a television system is configured to act as a proxy device for other devices. Generally, the client receiver is configured to perform transcoding and other processing to enable use of services by secondary devices which would otherwise not be able to utilize such services. In one embodiment, the client receiver includes a receiver configured to receive programming signals, an I/O interface configured to communicate with a secondary device, and a transcode subsystem. The transcode subsystem is configured to detect received data, determine a target secondary device of the received data, determine a target data format corresponding to the target secondary device, and initiate transcoding of the received data to the target data format.

In addition to the above, the method and mechanism may include detecting an attempted communication from an unregistered secondary device, and registering the device in response to determining the data format of the secondary device is supported. Further contemplated is automatically initiating a request for a transcode subunit which supports the data format of the unregistered secondary device, in response to determining the data format is not supported.

BRIEF DESCRIPTION OF THE DRAWINGS

Other objects and advantages of the invention will become apparent upon reading the following detailed description and upon reference to the accompanying drawings in which.

Figure 1:
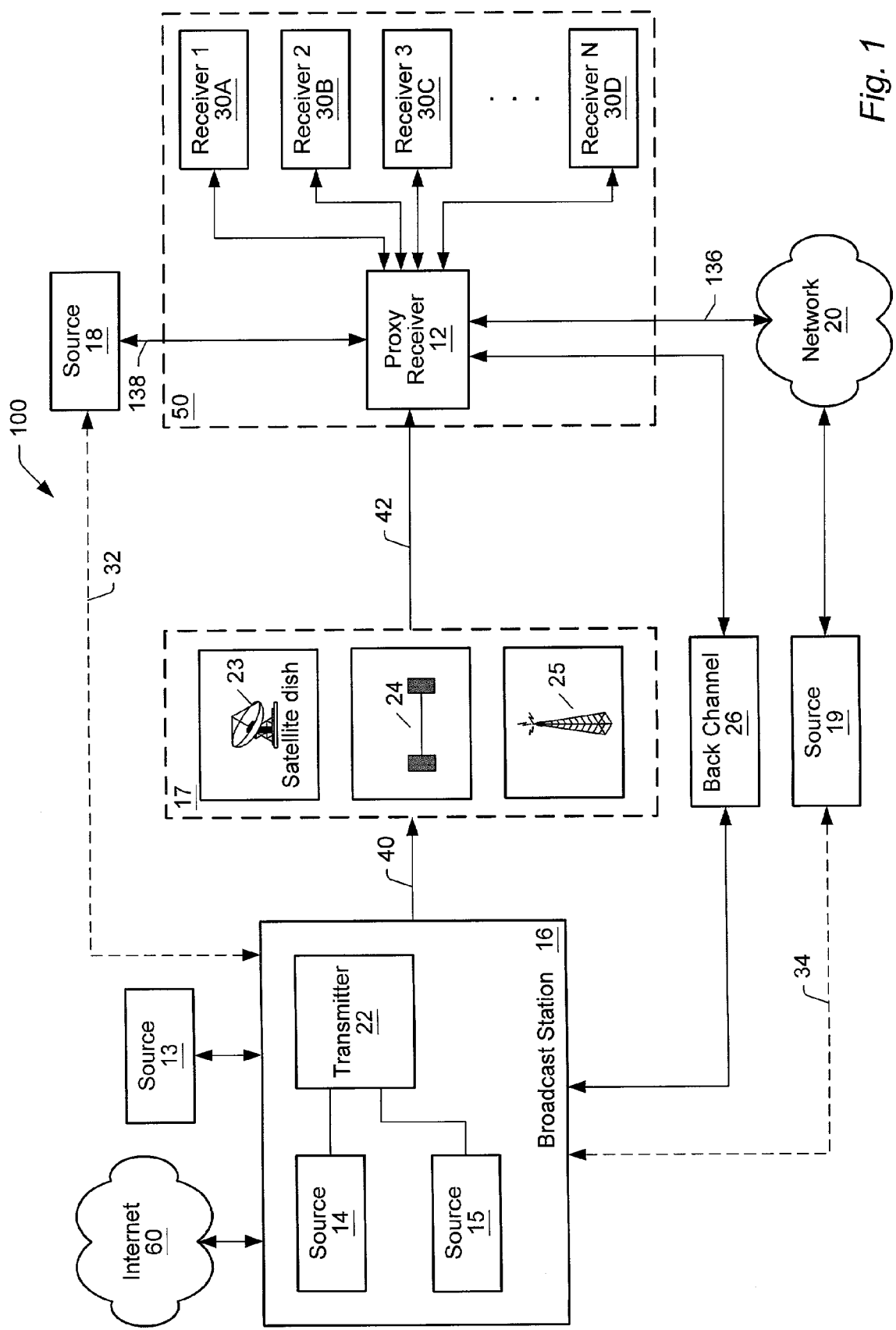
FIG. 1 is a diagram of one embodiment of a broadcast television system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

System Overview

Referring to FIG. 1, one embodiment of a television system 100 is shown. In the embodiment shown, a receiving device 12 is coupled to several sources of programming and/or interactive content. Receiving device 12 may comprise any number of suitable devices, examples of such devices include a set-top box (STB), a television (TV), a video cassette recorder (VCR), a personal video recorder (PVR), a personal digital assistant (PDA), a personal computer (PC), a video game console, or a mobile/cell phone. Also shown are receiving devices 30 coupled to receiving device 12. Receiving devices 30 may comprise any number of suitable devices, examples of such devices include a set-top box (STB), a television (TV), a video cassette recorder (VCR), a personal video recorder (PVR), a personal digital assistant (PDA), a personal computer (PC), a video game console, or a mobile/cell phone. Generally speaking, as will be further discussed below, receiver 12 is configured to act as a proxy for receiving devices 30.

Included in the embodiment of FIG. 1 is a broadcast station 16 coupled to receiver 12 via a transmission medium 17 and back channel 26. In addition, receiver 12 is coupled to a source 18 and source 19 via network 20. Further, broadcast station 16 is coupled to a remote source 13, and Internet 60. In the embodiment shown, broadcast station 16 includes sources 14 and 15 and transmitter 22. Transmission medium 17 may comprise a satellite based system 23, a cable based system 24, a terrestrial or multiple multi-point distribution service (MMDS) based system 25, a cellular system, a combination of these systems, or some other suitable system of transmission.

In the embodiment of FIG. 1, broadcast station 16 may include a variety of sources of content 14, 15, and 60 to be utilized and conveyed by transmitter 22. Content sources 14 and 15 may include databases, application servers, other audio/video sources, or other data sources. In one embodiment, content may be created at a source 14 which may include an authoring station configured to create such content. An authoring station may include a computer workstation configured with software which aids in the development of interactive content. An authoring station may be part of broadcast station 16 in which case the conveyance of the created content may be through a local computing network, or similar configuration. Alternatively, an authoring station may be remotely located 13 from broadcast station 16. In an embodiment where authoring station is not directly coupled to broadcast station 16, the content created by a source 13 may be conveyed to broadcast station 16 via Internet, broadcast, cable, etc. In some cases, content created by at a remote location 13 may first be transferred to a storage medium, such as a CD-RW, DVD, or flash memory device, and transported to broadcast station 16 via more conventional means where it may be stored in a database or other storage device.

Subsequent to its creation, content from sources 13, 14, 15 and 60 may be delivered to receiver 12 through a broadcast transmission network. This network consists of broadcast station 16 which assembles the content from sources 13, 14, 15 and 60 and processes the content as appropriate (e.g., digitizes, compresses, packetizes, encrypts), and a transmission network 17 which receives the content 40 from broadcast station 16 and conveys it 42 to receiving device 12. (It should be noted that receiving device 12 may be only one of many devices to which this content is distributed.) In one embodiment, broadcast station 16 includes software and/or hardware which is configured to process the content conveyed by sources 13, 14, 15 and 60 as described above. A second delivery mechanism may include a direct point-to-point connection 138 between receiver 12 and source 18 which may be some type of server. This connection 138 may be made via an ordinary telephone line, cable, wireless, or otherwise. A third delivery mechanism may also be a point-to-point connection 136, but transmission of the content from a source 19 to receiver 12 is made via one or more shared networks (e.g., over the Internet). FIG. 1 also illustrates broadcast station 16 may be optionally coupled to source 18 and/or source 19. Such a coupling may enable broadcast station 16 to work cooperatively with source 18 or source 19 in conveying content to receiver 12. Also illustrated in FIG. 1 is a back channel (or return path) 26 by which receiver 12 may convey to and/or receive data from broadcast station 16. Back channel 26 may comprise a telephone line, cable, wireless, or other connection.

One delivery mechanism, the direct point-to-point connection to a source of content, may comprise communication via an ordinary telephone line. This type of connection is typically initiated by the receiver 12 to convey information to, or retrieve information from, a data server. Another delivery mechanism, the point-to-point connection through one or more networks, may comprise a typical connection between nodes on the Internet. Because data may be routed through many different shared networks in this case, it may be read, stored and written many times as it is transmitted from source 19 to receiver 12. The third delivery mechanism may include a satellite, cable or terrestrial broadcast network 17.

Finally, proxy receiver 12 is configured to communicate with one or more other receivers 30A-30N. In one embodiment, proxy receiver 12 is configured to receive content from broadcast station 16 or other sources 18, 19, which is received in a format not compatible with receivers 30. Alternatively, if the format of the received data is compatible with receivers 30, receivers 30 may lack the processing, memory, or other resources required to effectively utilize the content received by proxy receiver 12. In one embodiment, proxy receiver 12 is configured to receive content from broadcast station 16, or other sources 18, 19, transcode and process the received content in a manner which makes the content compatible and receivable by a receiver 30, and convey the processed content to a receiver 30. In the embodiment shown, proxy receiver 12 and receivers 30 are located at the same general location 50, such as a viewer's home or an office. However, alternative embodiments are possible.

Figure 2:
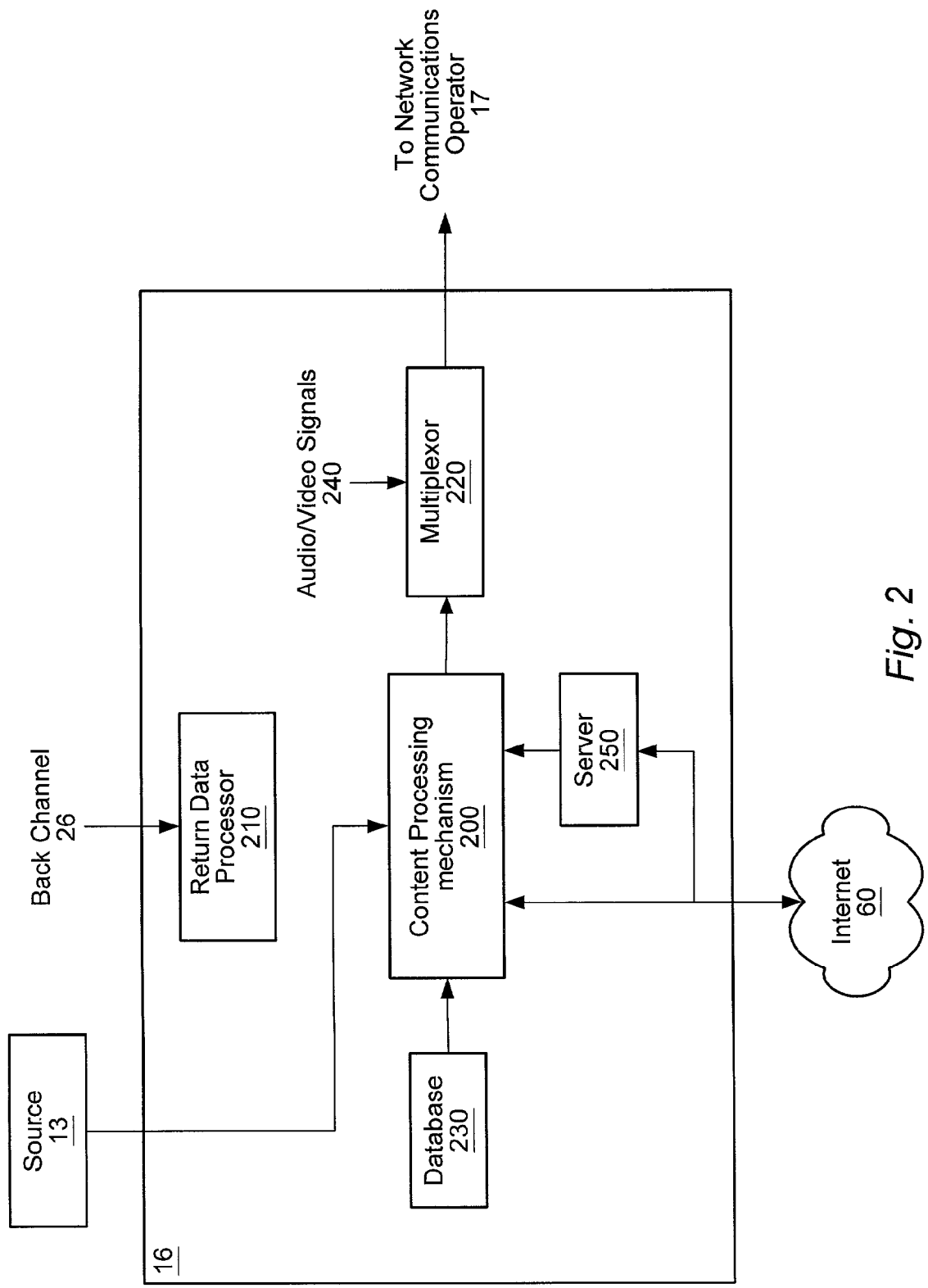
FIG. 2 is a diagram of one embodiment of a headend.

Turning now to FIG. 2, an overview of one embodiment of a broadcast station (head-end) 16 is shown. The broadcast station 16 of FIG. 2, includes an application server 250 and a database 230 which may contain previously created interactive content. Also shown in FIG. 2 is a source 13 of content which is external to broadcast station 16 and coupled to broadcast station 16. In addition, mechanism 200 and server 250 are coupled to the Internet 60. Database 230, server 250, Internet 60, and source 13 are coupled to a content processing mechanism 200 which is configured to process the content received and convey the processed content to a multiplexor 220.

In one embodiment, content processing mechanism 200 comprises a computer coupled to receive and convey content from source 13, database 230, server 250, or the Internet 60. Processing mechanism 200 is configured to convey the processed content to multiplexor 220. Multiplexor 220 is also coupled to receive audio/video signals 240. Multiplexor 220 multiplexes the received signals and conveys the multiplexed signal to network communications operator 17 where it is subsequently conveyed to a receiving device. Finally, broadcast station 16 includes a return data processor 210 coupled to back channel 26. In one embodiment, return data processor 210 may comprise a modem which receives data for further processing within broadcast station 16. While the above description describes a source of interactive content as being at a broadcast station 16, in an alternative embodiment database 230 and content processing mechanism 200 may reside at the location of a network communications operator 17. An example of such an alternative embodiment may be a cable station which inserts interactive content into a broadcast signal prior to transmission.

Transcoding and the Next Generation Receiver

As previously mentioned, television receivers may be configured to provide a variety of services, including interactive services, to viewers. Frequently, such receivers work in cooperation with the broadcaster or service provider by utilizing specifically formatted data and other signals. For example, if a viewer wishes to utilize interactive content corresponding to a particular sporting event, the viewer's receiver must be configured with specific hardware and/or software which is designed to receive and process the interactive content. Likewise, the receiver must be configured to receive and transmit data according to a particular pre-determined format. While such systems may provide services to viewers that were previously unavailable, their design limits their flexibility, expandability, and functionality. In order to provide for greater flexibility, functionality, and expandability, a next generation proxy receiver 12 is described herein. In one embodiment, a proxy receiver in a viewer's home is configured to perform transcoding and other processing to enable use of services by secondary devices which would otherwise not be able to utilize such services. In addition, the proxy receiver may be configured to provide communication between devices which would otherwise not be able to communicate with one another.

Figure 3:
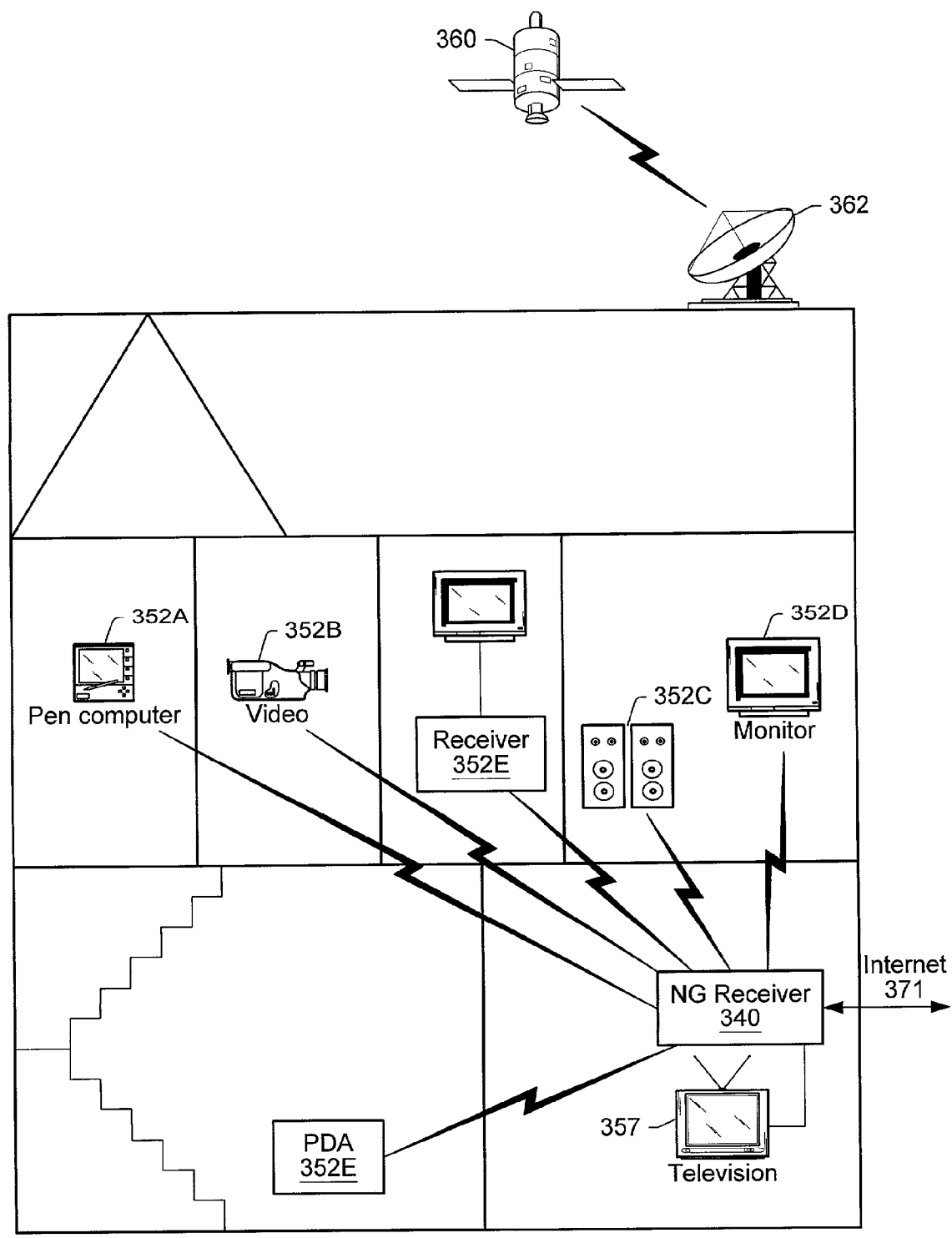
FIG. 3 illustrates one embodiment of a home area network.

Turning to FIG. 3, an illustration of one embodiment of the use of a next generation proxy receiver 340 is shown. FIG. 3 illustrates a building 370, such as a viewer's home, which is coupled to receive broadcast signals and communicate via Internet 371. While FIG. 3 illustrates signals being received via dish 362 and satellite 360, any suitable means of receiving signals, such as via cable, terrestrial or cellular, may be used. Receiver 340 is coupled to receive both the broadcast signal and Internet data. Also shown in FIG. 3 are a number of devices 352A-352E and television 357 which are configured to communicate with receiver 340. In the example shown are a television 357, a Personal Digital Assistant (PDA) 352E, monitor 352D, video camera 352B, electronic tablet 352A, audio speakers 352C, and receiver 352E. Receiver 352E may comprise a digital television (DTV) receiver with less capability than receiver 340. Generally speaking, each of devices 352 may include limited processing capability. For example, tablet 352A may include the ability display an image and receive input from a user via an electronic pen, stylus, or other device. However, tablet 352A may not include the processing capability to generate displays and respond to input in the manner of an ordinary desktop computer. Rather, proxy receiver 340 may be configured to perform processing tasks on behalf of tablet 352A. In such an embodiment, tablet 352A may simply detect input received from a user and convey raw data to receiver 340. Receiver 340 may then process the received data and convey corresponding visual or other data to tablet 352A for display.

In addition to limited processing capability, each of devices 352 may also be configured to communicate in a particular way utilizing a particular protocol and data format. For example, video camera 354 may be configured to transmit a video signal in the 900 MHz range. Alternatively, tablet 352A may be configured to transmit and receive data in the 2.4 GHz range. Further, the format of the data being communicated by each of the devices may be incompatible with each other. Other devices may be configured to communicate via IR, or in some other manner. Additionally, each of devices 352 may include the ability to support TCP, HTTP, IMAP or SSL. Receiver 340 may then offer the transcoding required for devices 352 to communicate and exchange data with one another, as well as with external locations, such as via Internet 371.

As mentioned above, a service provider may transmit HTML data, MPEG 1, 2 or 4 data, or other data. Data transmitted may be in a proprietary format such as RealAudio, RealVideo, Quicktime or Windows Media Player. (RealAudio and RealVideo are trademarks of Progressive Networks, Inc.; Quicktime is a trademark of Apple Computer, Inc.; Windows Media is a trademark of Microsoft Corporation). In one embodiment, receiver 340 is configured to not only receive this data, but also to transcode data from one format to another. For example, in one embodiment receiver 340 may receive HTML intended for use by a presentation engine and transcode the received HTML into a third party format which may be utilized by a PDA 358. Transcoding may include not only a format change, but also some other form of processing as well, such as compression. For example, a user may utilize a PDA 352E to browse the Web via receiver 340. In such an embodiment, a browsing session may run primarily on receiver 340. Receiver 340 may perform transcoding of Web data and images to a format compatible with PDA 352E. In addition, receiver 340 may be configured to convey and receive data via Web without any modification. In other words, PDA 352E may convey a request to receiver 340 for particular Web based content. The Web based server which contains the requested data does not contain the data in a format compatible with PDA 352E and does not include the ability to transform the data to a format compatible with the PDA 352E. Further, proxy receiver 340 does not convey any indication to the Web based server that any particular format is required. Rather, receiver 340 simply conveys a corresponding request to the Web based server for conveyance of the data in its native format. Upon receiving the data, receiver 340 is configured to perform any transformations or transcoding required to convert the received data to a format compatible with the PDA 352E. Further, if the communication link between PDA 352E and receiver 340 is of a relatively low bandwidth, receiver 340 may perform a suitable compression of the Web data prior to transmitting the data to the PDA 352E.

In addition to the above, receiver 340 may also be configured to provide networking capability for secondary devices 352 which would not ordinarily be able to communicate with one another. For example, receiver 340 may be configured to receive a video signal from camera 352B, and transcode the received signal to a variety of formats for transmission. As previously mentioned, transcoding may include authentication, encryption, compression, decompression, or any other suitable transformation. The received video signal may be transcoded to a format compatible with a display monitor 352D, PDA 325E, tablet 352A, or otherwise. For example, PDA 352E may include only a limited ability to display still images. On the other hand, video camera 352B may be configured to convey a video stream. In one embodiment, video camera 352B may be positioned at the entrance to a home to view arriving visitors. When a visitor rings the doorbell, a homeowner may utilize PDA 352E to send a request to receiver 340 to show the visitor. In response, the receiver 340 may capture a video image from the camera 352B, convert the image to a still image compatible for display on PDA 352E, and convey the image to PDA 352E. In an alternative embodiment, a microphone and speaker may be place at the door in order to capture audio from the visitor. The visitor may be prompted to state their name, which is captured and conveyed to receiver 340. Receiver 340 may then utilize voice recognition technologies to convert the captured audio to text. The text may then be conveyed to PDA 352E, or any other device for display of the text. Numerous variations are possible.

In one embodiment, a broadcast station 16 or other service provider is configured to push data in a single format. A receiver 340 in a viewer's home is configured to automatically perform any transcoding necessary in order to convert the pushed data to a format compatible with a device in the viewer's home. For example, a viewer may configure receiver 340 to automatically transcode pushed data to a format which is compatible with PDA 352E. In one embodiment, receiver 340 may be configured to receive pushed data and convey corresponding data to multiple devices in parallel. For example, receiver 340 may be configured to receive a television audio/video signal and convey the received signal to television 357. However, in addition to conveying the signal to television, receiver 340 may be configured to automatically transcode the signal to a format compatible with PDA 352E and continuously transmit the trancoded signal in parallel with the television signal. In such an embodiment, a viewer may be watching television, leave the room, and still keep up with the television program by carrying PDA 352E.

Figure 4:
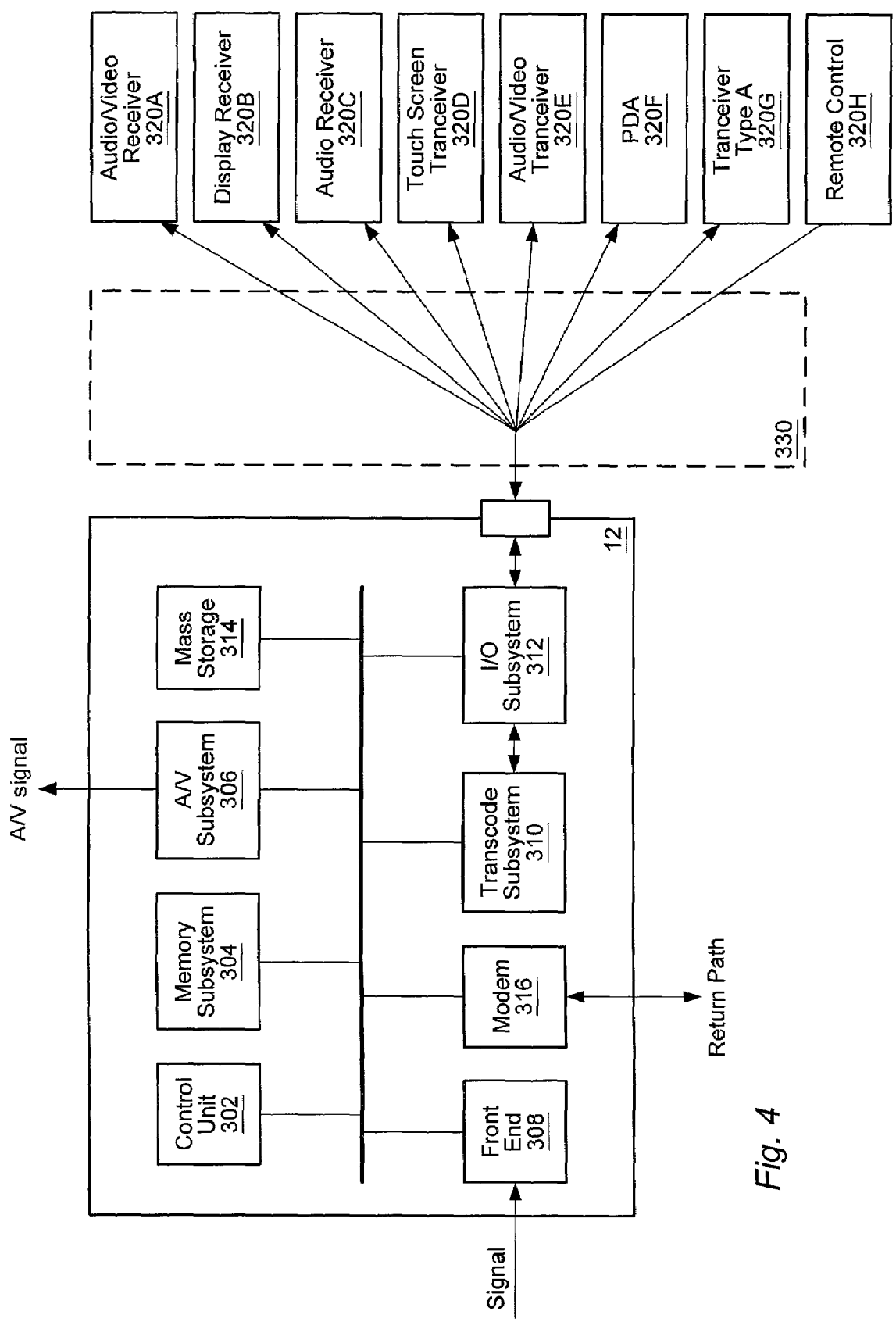
FIG. 4 is a diagram of one embodiment of a proxy receiver and secondary devices.

FIG. 4 illustrates one embodiment of a proxy receiver 12 configured to transcode data. In the embodiment of FIG. 4, receiver 12 includes a front end 308, control unit 302, memory subsystem 304, A/V subsystem 306, modem 316, I/O subsystem 312, mass storage 314, and transcode subsystem 310. In one embodiment, receiver 12 is implemented in a set-top box for a television. However, in other embodiments, receiver 12 may be incorporated into the circuitry of other components of a receiving station, such as a television, a video game console, a mobile/cell phone, or other device. In the embodiment shown, a broadcast signal is fed into front end 308 which selects a channel on which broadcast content is transmitted. The received broadcast signal may include audio/video content, and/or interactive television content. (It should be noted that audio/video content and interactive television content may also be delivered to receiver 12 through other signal receivers, such as modem 316.) The broadcast signal may contain other information as well. For example, control signals or other data may be embedded in the broadcast signal. In the embodiment shown, receiver 12 includes a mass storage device 314 within the receiver itself. Mass storage device 314 may include a hard disk drive, CD, DVD, or any other suitable storage device. Alternative embodiments of receiver 12 may be coupled to an external mass storage device, rather than including mass storage within the receiver 12 itself.

In the case of a digital satellite transmission, content may be formatted into packets and multiplexed into a signal which is de-multiplexed and reconstructed by control unit 302 into what is typically a compressed television program and/or interactive application embodied in the received content.

Compressed content may then be decompressed by A/V subsystem 306. The audio and video information associated with the television program embodied in the signal may then be conveyed for display. Applications reconstructed from the broadcast signal may be routed to memory subsystem 304 and executed by control unit 302. The user can interact with the applications or other interactive content through I/O devices which are coupled to receiver 12 via I/O subsystem 312. For example, a viewer may utilize an infrared remote control 320H. Alternatively, a viewer may utilize input devices such as a mouse, writing tablet, voice, or other device which is detected by I/O subsystem 312. Many other possible viewer input devices are possible and are contemplated. (It should be noted that the foregoing description of the functionality of the interactive television system is only an example of such a system, and is not intended to be limiting.)

Control unit 302 may comprise a microprocessor, microcontroller, digital signal processor (DSP), caches, or other devices suitable for instruction processing. Memory subsystem 304 may include memory units which are static (e.g., SRAM), dynamic (e.g., DRAM), volatile or non-volatile (e.g., FLASH), as required to support the functions of the receiver. In various embodiments, operating system code may be stored in FLASH memory, on mass storage 314, a combination, or any other suitable means of storage. When power is applied to the receiver, control unit 302 executes operating system code which is stored in memory subsystem 304. The operating system code executes continuously while the receiver is powered, similar to the operating system code of a typical personal computer (PC), and enables the receiver to execute control information, application code, or embedded software.

In one embodiment, a viewer uses a remote control to provide input to receiver 12. I/O subsystem 312 detects input provided by a viewer. Input received from a viewer via I/O subsystem 312 may then be stored in a message queue for processing by control unit 302. For example, receiver 12 may execute an interactive application which is configured to process commands and other input by a viewer by accessing a particular address region in memory. In such a configuration, a message queue for storing viewer input may be located at that particular address region. Alternatively, an interactive application may be configured to detect and receive input via the operating system code. Additionally, viewer inputs may be collected by one of devices 320 and transmitted to receiver 12 for processing. Those skilled in the art will recognize that numerous alternative configurations for conveying viewer input to an interactive application are possible, and such alternatives are contemplated.

In the embodiment shown, transcode subsystem 310 is configured to transcode data from one format to another. Further, I/O subsystem 312 is configured to convey data to a variety of devices 320, each of which may be configured to utilize data of only a particular format. The transmission medium and protocol 330 by which receiver 12 communicates with devices 320 may include P1394, Bluetooth, IEEE 802.11b, Hyperlan, USB, DSL, or any other suitable means. (Bluetooth is a trademark of Telefonaktiebolaget LM Ericsson Corporation Sweden). In one embodiment, secondary devices 320 may register with receiver 12. This registration may include configuration information corresponding to a secondary device, including required data format and any required communication details (e.g., IR, DSSS, port ID, etc.). This configuration information may then be utilized by transcode subsystem 310 to determine the appropriate data transcoding necessary. Further, registration data may be stored on mass storage 314 and then read into memory subsystem 304 upon startup. While FIG. 4 depicts a single communications port between receiver 12 and devices 320, multiple ports configured to communicate in different ways may be included. For example, an IR port and an Ethernet port may be included. It is also noted that transcoding may be performed off-line, where the transcoded content is stored in the receiver 12, for example in mass storage 314, prior to being transmitted to another device 320 or to a remote location via the return path.

Figure 5:
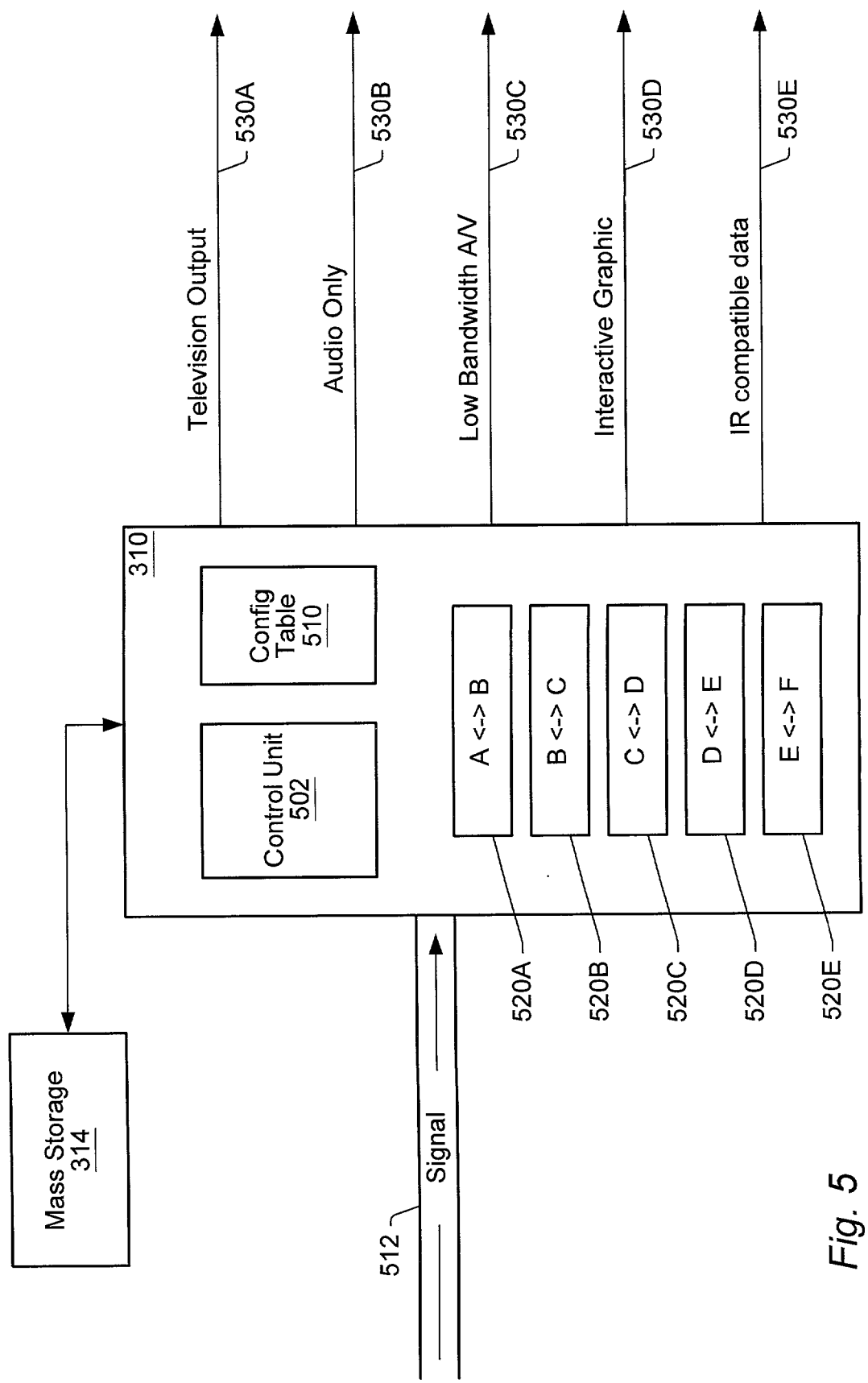
FIG. 5 is a diagram of one embodiment of a transcode subsystem.

FIG. 5 depicts one embodiment of a transcode subsystem 310 coupled to mass storage 314. FIG. 5 illustrates a signal 512 received by transcode subsystem 310 and signals 530A-530E generated by transcode subsystem 310. Transcode subsystem 310 includes a control unit 502, config table 510, and transcode subunits 520A-520E. Each of subunits 520 are configured to transcode data from one format to another. For example, subunit 520A is configured to transcode data between formats A and B. Subunit 520E is configured to transcode data between formats E and F. In one embodiment, config table 510 includes information which associates target secondary devices with a corresponding data format. Control unit 502 is configured to detect received data 512, determine a target format for the data by accessing config table 510, and initiate transcoding of the data to the target format if necessary. FIG. 5 illustrates that transcode subsystem 310 may generate signals of a variety of formats. For example, a format destined for television output 530A may be generated, an audio only format 530B, a reduced bandwidth A/V format 530C, and a graphic associated with an interactive application 530D are illustrated. As mentioned above, transcoded data may be stored in mass storage device 314 prior to transmission.

In one embodiment, in addition to receiving data for possible transcoding, transcode subsystem 310 may receive an indication of the target of that data. For example, signal 512 may include such an indication. In one embodiment, receiver control unit 302 may provide signals to transcode subsystem 310 indicating that a transcoding of data is required. The signals conveyed from control unit 302 may indicate both the data which is to be transcoded and the target of that data. In one embodiment, the target may be indicated by an ID which identifies the secondary device. Subsequent to receiving the data and target ID, control unit 502 may use the received ID in accessing config table 510 to determine the target format for the data. Upon determining the target format, master unit 502 may then initiate transcoding of the data to the target format utilizing the appropriate transcode subunit 520. In one embodiment, received data which requires no transcoding may simply be routed to the target.

In one embodiment, transcode subsystem 310 comprises circuitry specially configured to performing transcoding tasks. Config table 510 may comprise a memory configured to store configuration data for use by the subsystem 310. In one embodiment, secondary devices which have registered with receiver 12 have their corresponding configuration data stored on mass storage device 314. Upon startup of receiver 12, the stored configuration data may be read into config table 510 where it may be accessed in a low latency manner. Subunits 520 may also comprise circuitry for performing high speed transcoding operations. In one embodiment, subunits may comprise modules which may be easily added to or removed from receiver 12. In this manner, the functionality of receiver 12 may be changed or expanded. In an alternative embodiment, transcode subsystem 310 may be substantially comprised of software. For example, control unit 502 may comprise code which is included in the operating system of receiver 12. Config table 510 may comprise a data structure which is stored in memory subsystem 304. Subunits 520A may comprise software modules or objects for performing transcoding functions.

In one embodiment, receiver 12 may include a plug-and-play type functionality. If a user attempts to communicate with receiver 12 using a previously unregistered secondary device, receiver 12 may detect the attempted communication, and determine if the transcoding subunit 520 required for the secondary device is available. In the event the subunit 520 is available, the secondary device may be automatically registered. However, if the subunit 520 is not available, receiver 12 may be configured to automatically convey a request to a broadcast station, Internet site, or otherwise, for the required subunit. In response to the request, executable code corresponding to the transcode subunit may be conveyed to the receiver 12 and automatically installed. Alternatively, in lieu of automatically retrieving the required subunit, receiver 12 may be configured to provide an indication as to where the viewer may purchase the required subunit. For example, receiver 12 may display a message and corresponding link to a website on a television display where the subunit may be purchased.

Figure 6:
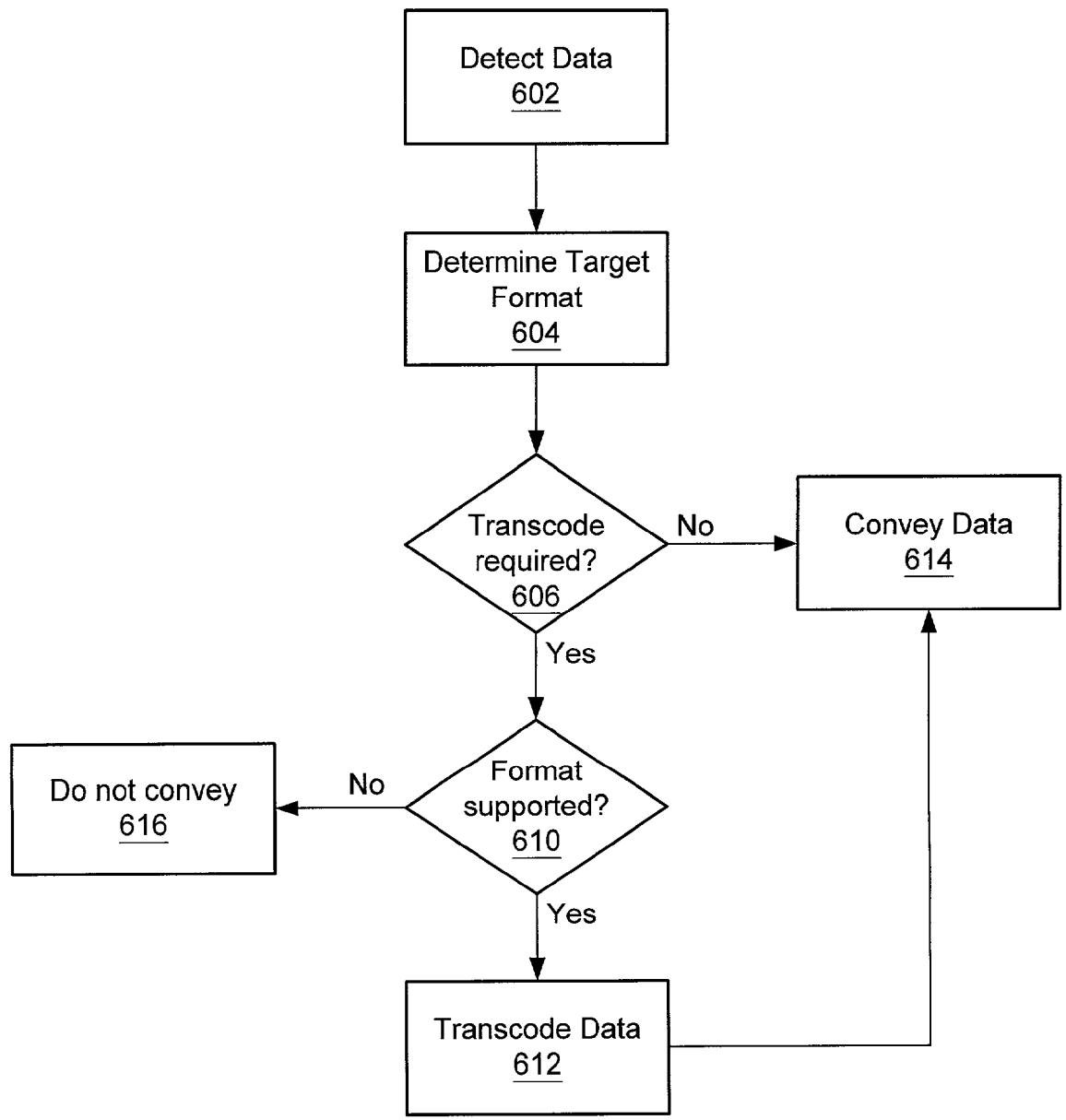
FIG. 6 illustrates one embodiment of a method for transcoding.

FIG. 6 illustrates one embodiment of a method for transcoding which may be utilized by a next generation proxy receiver. In response to detecting data which is to be conveyed (block 602), the target format of the data is determined 604. This determination may comprise accessing configuration information, or otherwise. Upon determining the target format of the data, a determination is made as to whether transcoding of the data is required (decision block 606). Generally speaking, if the data is already in the appropriate format, no transcoding will be required and the data will be conveyed without transcoding (block 614). Alternatively, if transcoding is required, a determination is made as to whether or not the target format is supported (decision block 610). If the target format is not supported, the data is not conveyed to the target device (block 616). In such a case the action taken may include simply ignoring the data, conveying a message to a viewer that the format is not supported, providing the viewer an opportunity to automatically request conveyance of software which supports the required transcoding operation, or any other suitable action. If the target format is supported, the data is transcoded (block 612) and conveyed (block 614).

It is to be understood that the above embodiments are intended to be exemplary only. Numerous alternative configurations are possible and are contemplated.

What is claimed is:

1. A client for use in a television system, wherein the client is located in a television viewer home and comprises:
   a receiver configured to receive a programming signal;
   an interface configured to communicate with a secondary device external to the client; and
   a transcode subsystem coupled to the receiver and the interface, wherein the transcode subsystem is configured to:
   detect a communication from the secondary device;
   determine a target data format corresponding to the secondary device;
   convey a request to an external entity for a transcode subunit corresponding to said target data format, in response to determining the transcode subsystem is not configured to support said target data format;
   retrieve the transcode subunit from an external entity, responsive to the request;
   receive data targeted to the secondary device, wherein the received data comprises a first data format;
   determine whether the first data format is compatible with the secondary device;
   identify the transcode subunit as corresponding to both the first data format and the target data format, in response to determining the first data format is not compatible with the secondary device; and
   initiate transcoding of the received data from the first data format to the target data format using the transcode subunit.

2. The client of claim 1, wherein the transcode subsystem includes a config table configured to associate the secondary device with the target data format.

3. The client of claim 1, wherein the transcode subsystem comprises a control unit configured to access the config table to determine the target data format, and wherein the transcode subsystem is further configured to register the secondary device in response to determining the transcode subsystem is configured to support said target data format.

4. The client of claim 1, wherein the transcode subsystem comprises a transcode subunit configured to perform the transcoding.

5. The client of claim 4, wherein the transcode subsystem further comprises a second transcode subunit configured to transcode data to a second data format.

6. The client of claim 2, wherein the transcode subsystem is configured to:
   detect an additional secondary device; and
   register the additional secondary device.

7. The client of claim 6, wherein registering the additional secondary device comprises storing an entry corresponding to the secondary device in the config table, wherein the entry indicates the corresponding target data format.

8. The client as recited in claim 1, wherein the transcode subsystem is configured to discard the received data in response to determining the first data format is not compatible with the secondary device, and determining no transcode subunit corresponding to both the first data format and the target data format is available.

9. The client of claim 1, wherein the transcode subunit is further configured to display an indication to a viewer as to where the transcode subunit may be obtained, in response to determining said transcode subunit is not automatically retrievable.

10. The client of claim 9, wherein said indication comprises a message selected from the group consisting of: a location where the requested subunit may be purchased; and a link to a website where the requested subunit may be obtained.

11. The client of claim 1, wherein the client is further configured to:
   receive a first request from the secondary device for remote data; and
   generate a second request corresponding to said first request, wherein said second request does not include an indication of a data format required by said secondary device.

12. A method for transcoding in a television receiver located in a viewer home, the method comprising:
   detecting a communication received from a secondary device;
   determining a target data format corresponding to said secondary device;
   conveying a request to an external entity for a transcode subunit corresponding to said target data format, in response to determining the transcode subsystem is not configured to support the target data format;

retrieve the transcode subunit from an external entity, responsive to the request;

receiving data targeted to the secondary device, wherein the received data comprises a first data format;

determining whether the first data format is compatible with the secondary device;

identifying the transcode subunit as corresponding to both the first data format and the target data format, in response to determining the first data format is not compatible with the secondary device; and transcoding the received data from the first data format to the target data format using the transcode subunit.

13. The method of claim 12, further comprising accessing a config table to determine the target data format; and registering the secondary device in response to determining a transcode subsystem of the receiver is configured to support said data format.

14. The method of claim 13, further comprising:

detecting an additional secondary device; and registering the additional secondary device.

15. The method of claim 14, wherein registering the secondary device comprises storing an entry corresponding to the additional secondary device in the config table, wherein the entry indicates a data format corresponding to the additional secondary device.

16. The method as recited in claim 12, further comprising discarding the received data, in response to determining the first data format is not compatible with the secondary device, and determining no transcode subunit corresponding to both the first data format and the target data format is available.

17. The method of claim 12, further comprising displaying an indication to a viewer as to where the transcode subunit may be obtained, in response to determining said transcode subunit is not automatically retrievable.

18. The method of claim 17, wherein said indication comprises a message selected from the group consisting of: a location where the requested subunit may be purchased; and a link to a website where the requested subunit may be obtained.

19. A television system comprising:

a first source for conveying a programming signal;

a proxy receiver configured to receive the programming signal, wherein the proxy receiver is located in a viewer home; and a secondary device coupled to the proxy receiver;

wherein the proxy receiver is configured to:

detect a communication from said secondary device;

determine a target data format corresponding to the secondary device;

convey a request to an external entity for a transcode subunit corresponding to said target data format, in response to determining the transcode subsystem is not configured to support said target data format;

retrieve the transcode subunit from an external entity, responsive to the request;

receive data targeted to the secondary device, wherein the received data comprises a first data format;

determine whether the first data format is compatible with the secondary device;

identify the transcode subunit as corresponding to both the first data format and the target data format, in response to determining the first data format is not compatible with the secondary device; and initiate transcoding of the received data from the first data format to the target data format using the transcode subunit.

20. The television system of claim 19, wherein the proxy receiver is configured to access a config table to determine the target data format; and wherein the proxy receiver is further configured to register the secondary device in response to determining the transcode subsystem is configured to support said target data format.

21. The television system of claim 20, wherein the proxy receiver is configured to:

detect an additional secondary device; and register the additional secondary device.

22. The television system of claim 21, wherein registering the additional secondary device comprises storing an entry corresponding to the secondary device in the config table, wherein the entry indicates an association between the corresponding target data format and the additional secondary device.

23. The television system as recited in claim 19, wherein said proxy receiver is configured to discard the received data in response to determining the first data format is not compatible with the secondary device, and determining no transcode subunit corresponding to both the first data format and the target data format is available.

24. The television system of claim 19, wherein the proxy receiver is further configured to:

detect a communication from an unregistered secondary device; and register the unregistered secondary device in response to determining the proxy receiver is configured to support a data format corresponding to the unregistered secondary device.

25. The television system of claim 24, wherein the proxy receiver is further configured to display an indication to a viewer as to where the transcode subunit may be obtained, in response to determining said transcode subunit is not automatically retrievable.

26. The television system of claim 25, wherein said indication comprises a message selected from the group consisting of: a location where the requested subunit may be purchased; and a link to a website where the requested subunit may be obtained.

27. The client as recited in claim 1, wherein the transcode subsystem is configured to store a plurality of transcode subunits, each of which transcodes data from one format to a different format.

28. The client as recited in claim 1, wherein said secondary device is selected from the group consisting of: a television, personal digital assistant, video monitor, video camera, electronic tablet, audio speakers, audio receiver, cell phone, game console, web based server, and a remote control.

29. The client as recited in claim 1, wherein the transcode subsystem is further configured to automatically retrieve the transcode subunit from an external entity without receiving a user request for the transcode unit.

30. The method as recited in claim 12, further comprising automatically retrieving the transcode subunit from an external entity without receiving a user request for the transcode unit.

31. The television system of claim as recited in claim 19, wherein the proxy receiver is further configured to automatically retrieve the transcode subunit from an external entity without receiving a user request for the transcode unit.

* * * * *

UNITED STATES PATENT AND TRADEMARK OFFICE
CERTIFICATE OF CORRECTION

PATENT NO. : 7,634,795 B2 Page 1 of 1
APPLICATION NO. : 10/044348
DATED : December 15, 2009
INVENTOR(S) : Vincent Dureau It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1292 days.

Signed and Sealed this

Ninth Day of November, 2010

David J. Kappos
*Director of the United States Patent and Trademark Office*